United States Patent [19]

Hofmann

[11] 4,047,223
[45] Sept. 6, 1977

[54] FREQUENCY SCANNING AUTOMATIC PHASE CONTROL SYSTEM

[75] Inventor: Judson A. Hofmann, Schaumburg, Ill.

[73] Assignee: Zenith Radio Corporation, Glenview, Ill.

[21] Appl. No.: 649,954

[22] Filed: Jan. 16, 1976

[51] Int. Cl.² .................... H04N 5/05; H01S 1/00; H03F 3/68
[52] U.S. Cl. .................... 358/158; 358/159; 331/4; 331/20
[58] Field of Search ............ 178/69.5 TV; 331/18, 331/20, 4; 358/19, 158, 159

[56] References Cited
U.S. PATENT DOCUMENTS

| | | | |
|---|---|---|---|
| 2,833,923 | 5/1958 | Gruen | 331/4 |
| 3,370,252 | 2/1968 | Zoerner | 331/18 |
| 3,715,499 | 2/1973 | Steckler | 331/20 |

*Primary Examiner*—John C. Martin
*Attorney, Agent, or Firm*—Roy A. Ekstrand

[57] ABSTRACT

A frequency scanning automatic phase control includes a phase detector, a local oscillator and an APC filter. A coincidence detector includes an AND gate responsive to the horizontal retrace and reference synchronizing pulses. A lock detector also responsive to the retrace and reference sync pulses produces an output signal when a predetermined interval of non-coincidence has existed. An AND gate responsive to both the lock detector and coincidence detector gates a current sink which unbalances the phase detector producing a ramp-like error voltage across the APC filter. A threshold detector coupled to the APC filter activates a discharge circuit also coupled to the filter when the filter voltage exceeds the threshold. The oscillator responds to the variations of error voltage and changes frequency accordingly. Once coincidence occurs frequency variation ceases and is resumed only if non-coincidence returns.

14 Claims, 2 Drawing Figures

FREQUENCY SCANNING AUTOMATIC PHASE CONTROL SYSTEM

BACKGROUND OF THE INVENTION

This invention relates generally to television receivers and particularly to the horizontal scansion systems thereof.

In the typical television receiver, a transmitted signal bearing information components of picture, sound and deflection synchronization information is received by an antenna and processed by a tuner and intermediate frequency amplifier to a level sufficient to permit recovery of the modulated components. The latter take the form of a combined train of pulses at vertical and horizontal scansion frequencies. A cathode ray tube (CRT) display device is caused to be simultaneously scanned in the vertical and horizontal directions by individual vertical and horizontal scansion systems within the receiver.

In both the horizontal and vertical systems, a local oscillator generates a scansion signal which is increased by appropriate power amplifying circuitry to a level sufficient to drive electromagnetic yoke windings situated on the CRT. Proper display of the picture components within the signal requires that both the vertical and horizontal scansions be appropriately timed to the incoming signal information. In the vertical deflection or scansion system (operative at approximately 60 hertz), the vertical scansion synchronization pulses are usually applied directly to the vertical oscillator triggering it and causing it to operate at the desired frequency and phase.

While this method of synchronization has proven satisfactory for the vertical scan system, the higher frequency (approximately 15 kHz), horizontal scansion system is generally synchronized in a different manner. In most horizontal scan systems a local automatic phase control loop is operative upon the oscillator. Such systems generally include a phase detector or multiplier which responds to the reference synchronization pulses and a feedback sample of horizontal oscillator output. The phase detector compares the reference and oscillator signals and generates an error signal representing the deviation of oscillator frequency and phase from that of the reference pulses. The error signal is coupled to a low pass filter which minimizes the effects of signal noise and determines the response speed of the APC loop. The filtered error signal is coupled back to a voltage control point within the horizontal oscillator completing the loop and affecting frequency control.

Automatic phase control systems operative upon the horizontal oscillator, are well known in the industry. However, while their use has proven generally satisfactory under most operating conditions several often serious shortcomings do arise. For example, the system requirements of adequate oscillator pull-in range and optimization of system speed may be conflicting.

Oscillator pull-in range is the maximum frequency difference between the oscillator and reference sync pulses which the system can overcome or correct. Generally, pull-in range is determined largely by the gain of the APC loop together with the transfer characteristic of the APC filter. In many systems the limit of synchronization is that phase difference which produces a quadrature relationship between oscillator and sync reference.

In most instances system speed is determined largely by the bandwidth of an APC filter within the loop. The filter is selected to minimize noise effects on oscillator phase. However, narrower bandwidths reduce system pull-in range. Because the two system requirements are conflicting, typical receiver APC systems represent a comprise in which oscillator pull-in range is selected with an eye toward oscillator drift characteristics resulting in a wider system bandwidth than otherwise desired.

Another approach to the problem is to sense the absence of synchronization and activate an auxiliary oscillator which modulates the error voltage applied to the horizontal scansion oscillator causing it to "sweep" through a range of frequencies. If during its frequency variation synchronism occurs, the auxiliary oscillator is deactivated and synchronization is maintaind by the "normal" APC action.

Such systems simultaneously provide the advantages of extensive pull-in range and minimized static phase error because the APC filter characteristic and loop gain are selected for minimum static phase error. The pull-in range is determined by the frequency excursion of the scansion oscillator which is substantially independent of the APC loop filter and gain characteristics. While providing a high performance alternative to the compromized APC loop such systems are generally expensive and complex since an additional otherwise unnecessary oscillator is used to "sweep" the horizontal scansion oscillator. Further the circuitry required to sense the presence or absence of scansion synchronization is generally complex, expensive and often unreliable.

OBJECTS OF THE INVENTION

Accordingly, it is an object of the present invention to provide an improved horizontal APC system for a tel. vison receiver.

It is a more particular object to provide an inexpensive reliable frequency scanned horizontal APC system.

SUMMARY OF THE INVENTION

An automatic phase control system includes an oscillator, a phase detector, and filter synchronizing the oscillator output to a source of synchronizing information. Configuring means coupled to the filter periodically vary the oscillator frequency during the simultaneous existence of an out-of-sync condition and non-coincidence. Coincidence means detect the existence of coincidence between the oscillator and synchronizing information and lock detecting means detect the existence of an out-of-sync condition by comparison of coincident and non-coincident intervals.

BRIEF DESCRIPTION OF THE DRAWINGS

The features of the present invention which are believed to be novel are set forth with particularly in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
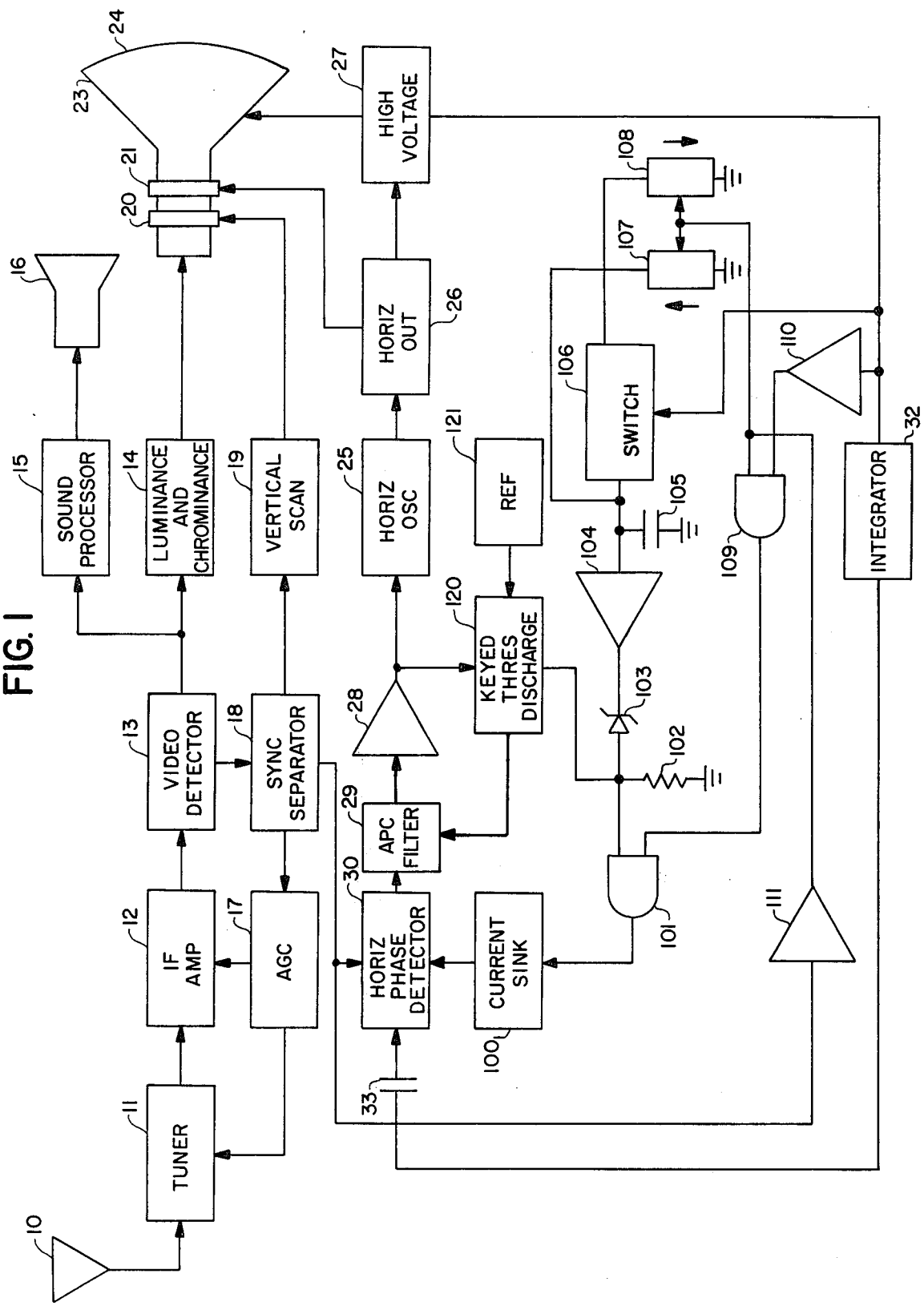
FIG. 1 is a block diagram representation of the present invention APC system used in a television receiver.

FIG. 1 shows a block diagram representation of a television receiver constructed in accordance with the present invention. A tuner 11 receives an information bearing signal incident upon antenna 10 which is converted to an intermediate frequency signal and coupled to an intermediate frequency amplifier 12 which in turn amplifies the signal to a level sufficient to drive a video detector 13. The modulation components of picture, sound and deflection synchronization information are recovered from the intermediate frequency signal by detector 13 and are applied to a luminance and chrominance processor 14 which in turn drives the control electrodes (not shown) of a conventional CRT 23.

The output of video detector 13 is also applied to a sound processor 15, which in turn drives a speaker 16, and a sync separator 18 which recovers the horizontal and vertical scan synchronization (sync) pulses. Sync separator 18 separates the horizontal and vertical scansion synchronizing pulses. The former are applied to a vertical scan system 19 which provides a vertical scansion signal driving a vertical deflection yoke 20 situated on CRT 23. Sync separator 18 also drives an AGC control voltage generator 17 which by conventional amplitude comparison techniques produces a control voltage which is fed back to intermediate frequency amplifier 12 and tuner 11 providing a substantially constant output signal level at detector 13.

A horizontal oscillator 25 generates a horizontal rate scansion signal which is coupled to a horizontal output amplifier 26 raising the scan signal to a sufficient level to drive a horizontal deflection yoke 21 situated on CRT 23. The output of horizontal amplifier 26 is also coupled to a high voltage generator 27 which produces an accelerating voltage for CRT 23. A sample of the high-amplitude short-duration horizontal scansion retrace pulse is coupled from high voltage generator 27 to the input of an integrator 32 which converts it to a sawtooth waveform. The resulting sawtooth waveform is coupled by a series capacitor 33 to one input of a phase detector 30. The horizontal synchronizing pulses produced by sync separator 18 are coupled to the other input of phase detector 30.

Detector 30 performs a frequency and phase comparison of the input saw waveform and reference sync pulse and produces (by techniques later described) an error voltage which is applied to a low pass filter 29. The output of low pass filter 29 is coupled via a buffer amplifier 28 to a control voltage point within horizontal oscillator 25.

The input signal to integrator 32 is also coupled to a switch 106 and to an inverting amplifier 110 the inverted output of which is coupled to one input of an AND gate 109. A pair of oppositely poled keyed current sources 107 and 108 are coupled to switch 106. The output of sync separator 18 is coupled via an inverting amplifier 111 to current sources 107 and 108 and to the remaining input of AND gate 109, the output of which is coupled to one input of an AND gate 101.

The output of switch 106 is connected to ground by a capacitor 105 and to buffer amplifier 104. The output of the latter is connected to the cathode of a zener diode 103 having its anode connected to ground by a resistor 102 and to the remaining input of AND gate 101. The output of AND gate 101 is connected to current sink 100. A keyed threshold discharging circuit 120 has inputs connected to the anode of zener 103, buffer amplifier 28, and a source of reference voltage 121. The output of discharge circuit 120 is connected to APC filter 29.

The operation of the APC system shown in FIG. 1 is best understood by temporarily omitting the functions of keyed discharge circuit 120 and current sink 100. When the system is "in-sync" the horizontal output signal and sync pulses are in phase. The output signal of oscillator 25 amplified by output amplifier 26 drives high voltage generator 27 and yoke 21 producing short-duration high-amplitude retrace pulses and long duration scansion signals. A sample of the output retrace pulse is fed back through integrator 32 which forms a sawtooth signal which in turn is coupled via capacitor 33 to phase detector 30. The phase detector is keyed by applied sync pulses and during the sync interval generates an error signal which is proportional to the difference in phase between the sync pulse and the zero crossing of the sawtooth signal. This in turn alters the charge stored in APC filter 29. Between sync pulses the stored error voltage in filter 29 remains unchanged. If the phase of the oscillator drifts from the desired the error voltage changes and a correction signal is applied to it to restore phase synchronization.

An understanding of the remainder of the circuit is best obtained by first considering the phase relationships between horizontal retrace and reference signals with regard to both in-sync and out-of-sync conditions. When the oscillator is properly synchronized the reference sync pulses and horizontal retrace signal are continuously coincident. When an out-of-sync condition exists coincidence occurs for brief intervals separated by longer intervals of non-coincidence. The repetition rate of the brief coincidence intervals is determined by the frequency difference between the retrace pulses and sync signals, that is, the "best note" frequency.

With this brief discussion the operation of the remainder of the present invention APC system may now be explained. Keyed current source 107 is connected to capacitor 105. Each reference sync pulse gates current sources 107 and 108 on. During each retrace pulse, switch 106 additionally connects current source 108 to capacitor 105. Current source 107 remains connected to capacitor 105 and is activated simultaneously with current source 108. However, current source 108 conducts approximately twice as heavily as source 107. As a result when activated source 108 carries not only the current of source 107 but also discharges capacitor 105 when the sync and retrace pulses are coincident.

During in-sync conditions successive current source gating periods occur while both current sources 107 and 108 are coupled causing a discharge of capacitor 105 which maintains the output of buffer amplifier 104 below the breakdown of zenor 103. As a result no voltage is developed across resistor 102 keeping one input of AND gate 101 low which in the absence of "highs" at both inputs remains nonconductive.

During out-of-sync conditions brief periods of coincidence exist during which current source 108 discharges capacitor 105. However, during the longer intervals of non-coincidence alluded to above current source 108 is not coupled to capacitor 105 during the sync interval which allows current source 107 to charge the capacitor. Since the charging interval far exceeds the discharging interval (due to narrow pulses used), the voltage on capacitor 105 coupled through buffer amplifier 104 reaches the breakdown voltage of zener 103 after a controlled interval and a voltage is developed across resistor 102 which maintains one input of AND gate 101 high. The voltage across resistor 102 also enables discharge circuit 120 the operation of which will be described below.

The reference sync pulses are applied through an inverting amplifier 111 to one input of AND gate 109 making it high during the pulse interval. The horizontal retrace signal inverted by amplifier 110 is applied to the other input of AND gate 109 causing it to be high in the absence of a retrace pulse. As a result during in-sync conditions the inputs to AND gate 109 are not simultaneously high due to coincidence of the positive going sync pulse and negative going inverted retrace pulse and the output of AND 109 remains low. During out-of-sync conditions the output of AND gate 109 remains low during the brief coincidence intervals and goes high during the longer non-coincidence intervals when a reference cync pulse occurs.

Thus one input to AND gate 101 due to the output of AND gate 109 is high whenever a reference sync pulse exists without a flyback pulse. In contrast, the other input to AND gate 101 due to the voltage across resistor 102 is high only after a prolonged period dominated by intervals of non-coincidence. Since both the inputs of AND gate 101 must simultaneously be high to produce a high output, AND gate 101 enables current sink 100 during each sync pulse only if an out-of-sync condition has existed for a predetermined interval and there is no coincidence between sync and retrace pulses. The importance of this will become more apparent below.

Current sink 100, when keyed by AND gate 101, induces an unbalanced condition in phase detector 30 of such polarity as to cause charging of APC filter 29. The rising voltage at filter 29 coupled through buffer amplifier 28 causes the frequency of oscillator 25 to increase correspondingly. Discharge circuit 120 compares the filter voltage to reference 121 and, at a predetermined voltage, rapidly discharges the APC filter decreasing the frequency of oscillator 25. After filter discharge the voltage across the APC filter again builds and successive cycles produce a sawtooth filter voltage which causes oscillator 25 to be frequency "scanned" during out-of-sync conditions.

Whenever coincidence between sync and retrace pulses occurs the output of AND gate 109 goes low disabling AND gate 101 and current sink 100 and the APC filter voltage remains unchanged. If synchronism has been achieved coincidence will persist and frequency scanning ceases. If, however, coincidence is merely due to the brief beat note between sync and retrace pulses, the output of AND 109 again goes high during each sync pulse at the end of the coincidence interval and frequency scanning is resumed. The frequency scanning system causes the scansion oscillator to vary over a predetermined frequency range until the oscillator frequency equals that of the reference sync. Once this frequency is established coincidence returns and frequency scanning ceases. Phase lock or synchronism is established and maintained by the "normal" or in-sync operation of the APC loop described above.

Figure 2:
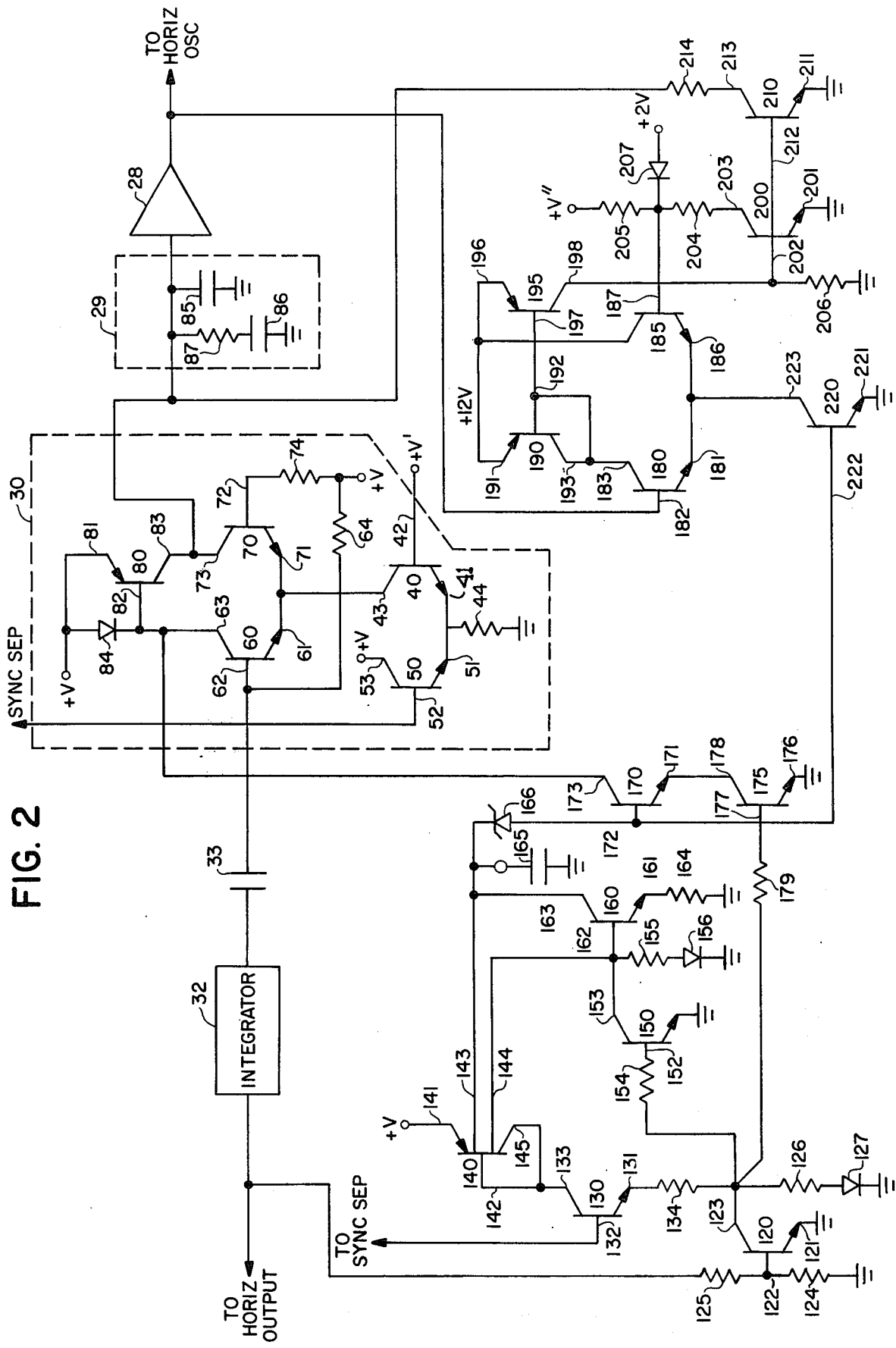
FIG. 2 is a schematic detail of a portion of the APC system shown in FIG. 1.

FIG. 2 shows the frequency scanning circuitry of the present invention in schematic detail. Phase detector 30 includes a differential amplifier formed by a transistor 60 having an emitter 61, a base 62 connected to capacitor 33, and a collector 63 connected to a source of positive potential V by a diode 84 in combination with a transistor 70 having an emitter 71 connected to emitter 61, a base 72 connected to a source of positive potential V by a resistor 74, and a collector 73 connected to a hold capacitor 85 within low pass filter 29. A resistor 64 couples base 62 to a source of positive potential V.

A second differential amplifier within phase detector 30 is formed by a transistor 40 having an emitter 41 connected to ground by a resistor 44, a base 42 connected to a source of reference potential V', and a collector 43 connected to the junction of emitters 61 and 71 in combination with a transistor 50 having an emitter 51 connected to emitter 41, a base 52 connected to sync separator 18, and a collector 53 connected to a source of positive potential V. A series combination of a resistor 87 and a capacitor 86 are connected in parallel with hold capacitor 85 to complete low pass filter 29.

An input transistor 120 has an emitter 121 connected to ground, a base 122 coupled to ground by a resistor 124 and to integrator 32 by a resistor 125, and a collector 123. A series combination of a resistor 126 and a diode 127 couples collector 123 to ground. A transistor 130 has an emitter 131 coupled to collector 123 by a resistor 134, a base 132 connected to sync separator 18 and a collector 133. A multi-collector PNP transistor 140 has an emitter 141 connected to a source of positive potential V, a base 142 connected to collector 133, a first collector 145 connected to base 142, and second and third collectors 143 and 144. A transistor 150 has an emitter 151 connected to ground, a base 152 connected to collector 123 by a resistor 154 and a collector 153 connected to collector 144 of transistor 140. A series combination of a resistor 155 and a diode 156 couples collectors 153 and 144 to ground. A transistor 160 has an emitter 161 coupled to ground by a resistor 164, a base 162 connected to collector 153 and a collector 163 connected to collector 143. A hold capacitor 165 is connected between collector 143 and ground. A transistor 175 has an emitter 176 connected to ground, a base 177 coupled to collector 123 by a resistor 179 and a collector 178. A transistor 170 has an emitter 171 connected to collector 178, a base 172 connected to the anode of a zener diode 166, the cathode of which is connected to capacitor 165 and a collector 173 which is connected to collector 63 of transistor 60.

A current sink transistor 220 has an emitter 221 connected to ground, a base 222 connected to base 172 and a collector 223. A differential amplifier is formed by a first differential transistor 180 having an emitter 181, a base 182 connected to the output of buffer amplifier 28 and a collector 183 and a second differential transistor 185 having an emitter 186 connected to the junction of emitter 181 and collector 223, a base 187, and a collector 188 connected to a supply of positive potential V. A PNP transistor 190 has an emitter 191 connected to V, a base 192 and a collector 193 connected to collector 183 and base 192. A PNP transistor 195 has an emitter 196 connected to V, a base 197 connected to base 192 and a collector 198 coupled to ground by a resistor 206. A transistor 200 has an emitter 201 connected to ground, a base 202 connected to collector 198, and a collector 203 connected to V' by the series combination of a resistor 204 and a resistor 205, the junction of which is connected to base 187 and coupled to V by a diode 207. A transistor 210 has an emitter 211 connected to ground, a base 212 connected to base 202 and a collector 213 coupled to APC filter 29 by a resistor 214.

The operation of phase detector 30 as well as low pass filter 29 within the horizontal APC loop is conventional. The horizontal retrace signal formed to a sawtooth signal by integrator 32 comprises a sample representative of the output signal generated of horizontal oscillator 25. The sawtooth output of integrator 32 is AC coupled through capacitor 33 to base 62 of transistor 60 forming one input to the phase detector. During in-sync conditions, the center of the reference sync pulse and the center of the negative-going slope portion of the sawtooth waveform are coincident.

Under such "in-sync" conditions, a negative-going sync pulse at base 52 causes normally conductive transistor 50 to turn off decreasing the voltage developed across resistor 44. The reduction in voltage across resistor 44 causes the voltage at emitter 41 to drop which in turn increases the collector to emitter current of transistor 40.

Transister 40 forms the current sink of differential transistor pair 60 and 70 and its conduction in response to the sync pulse causes a simultaneous conduction in transistors 60 and 70. The ratio of collector currents in transistors 60 and 70 is determined by the relative voltages at bases 62 and 72 The latter is maintained at a constant voltage by resistor 74 and source V which acts as a signal (or AC) ground. As a result the voltage at base 62 determines the relative currents in transistors 60 and 70. If the sawtooth waveform is equally distributed about the bias voltage V during the interval when the sync pulse causes conduction, differential transistors 60 and 70 conduct over equal intervals. When the sawtooth is positive transistor 60 conducts more heavily. Conversely, when the sawtooth is negative transistor 70 conducts more heavily.

The current applied to filter 29 is the difference between the average collector currents of transistors 70 and 80. Diode 84 and transistor 80 form a current "mirror" circuit in which equal currents are carried by the diode and transistor. Since diode 84 will under all conditions carry the same current as transistor 60 and that same current will be carried by transistor 80 due to the current mirror changes in relative conduction between transistors 60 and 70 will cause an additional current to flow into or out of hold capacitors 85 and 86.

If the oscillator free running frequency equals that of the sync pulses, the average conductions of transistors 60 and 70 are equal and the net hold capacitor current is zero. If the horizontal oscillator free running frequency is higher than the sync pulses, the conductions of transistors 60 and 80 and diode 84 are reduced and current is drawn from hold capacitors 85 and 86 by transistors 70. The resulting discharge of hold capacitors 85 and 86 lowers the error voltage coupled through buffer amplifier 28 to horizontal oscillator 25. This lower voltage in turn causes a decrease of oscillator frequency. The error voltage is then maintained on hold capacitors 85 and 86 until the next horizontal sync pulse causes another "sampling" cycle in which the phase detector is again turned on and the base voltage of transistor 60 again determines whether additional current is drawn from hold capacitors 86 and 85. The successive "sample and hold" cycles continue until an error voltage across the filter sufficient to maintain the frequency of the oscillator equal to that of the reference sync pulses exists.

Because the differential amplifier phase detector is nonconductive, the voltage on hold capacitors 86 and 85 remains constant between sync pulses and the system functions as a sample-and-hold circuit in which periodic samplings of the correctness of system relationship occur between which the system remains steady at the last derived value.

Of course, if the free running frequency of oscillator 25 decreases below the desired frequency, the sawtooth lags the reference sync pulses, base 62 is positive causing an increase in the average conduction of transistors 60, diode 84 and transistor 80. The excess conduction of transistor 80 cannot be carried by transistor 70 (since its conduction is reduced) and hold capacitors 85 and 86 are charged raising the stored error voltage. The increased error voltage applied through buffer amplifier 28 to horizontal oscillator 25 causes an increase oscillator frequency. Again the process is repeated until correct phase is restored.

Turning now to the operation of the remaining circuitry, a positive-going sync pulse applied to base 132 of transistor 130 causes it to conduct and turn on multi-collector PNP transistor 140. The conduction of transistor 130 also establishes a voltage across resistor 126. During coincidence the positive-going retrace pulse applied to base 122 causes transistor 120 to conduct placing the junction of resistors 134 and 126 close to ground potential and turning off transistors 175 and 150. With transistor 150 turned off current in collector 144 of transistor 140 establishes a voltage across resistor 155 and diode 156 turning on transistor 160 which discharges capacitor 165.

If retrace and synchronizing pulses are not coincident, transistor 120 is off during the sync pulse interval and transistors 150 and 175 are turned on. Conduction by the former places base 162 close to ground potential turning off transistor 160 in which case current carried by collector 143 during sync pulse conductor of transistor 140 charges capacitor 165. If non-coincidence persists successive sync pulses cause buildup of the voltage across capacitor 165 until the zener breakdown voltage of diode 166 is reached at which time a positive voltage is applied to the base 172 of transistor 170 causing it to conduct if transistor 175 is conducting. Transistor 120 is nonconducting in the absence of a retrace pulse. The conduction of transistor 130 during the sync pulse intervals establishes a positive voltage at base 177 turning on transistor 175. As a result during non-coincidence once zener 166 breaks down the series combination of conducting transistors 170 and 175 are coupled to one side of the differential amplifier within phase detector causing an increase in the current through diode 84 which is reflected by the above-described current mirror action increasing conduction of transistor 80. The increased conduction of transistor 80 causes a voltage buildup across capacitors 86 and 85 within APC filter 29 producing a ramp-like increase in voltage.

The breakdown of zener diode 166 also produces a positive bias on the base of current sink transistor 220 causing it to conduct which in turn causes conduction of the differential amplifier formed by transistors 180 and 185. The bias network formed by resistors 205 and 204 connected to source V" together with diode 207 connected to a 2V reference source cause transistor 185 to be normally conducting which be well known differential amplifier function causes transistor 180 to be nonconducting. However, when the increasing voltage due to the charging of capacitors 86 and 85 coupled through buffer amplifier 28 produces a positive voltage on base 182 in excess of the voltage maintained on base 187, the differential amplifier "flips" and transistor 180 begins conducting to the exclusion of transistor 185. Transistor 190 having collector and base connected is actually a diode and in combination with transistor 195 forms the familiar current mirror characterized by equal conductions in transistors 180 and 195. A positive voltage developed across resistor 206 by the conduction of transistor 195 turns on transistors 200 and 210. Conduction by transistor 200 reduces the voltage at base 187 below V". Transistor 210 conduction discharges capacitors 85 and 86 via resistor 214 collector-to-emitter path of the transistor. The decrease in voltage across APC filter 29 coupled through buffer amplifier 28 reduces the voltage at base 182 of transistor 180.

When this reduction lowers the voltage at base 182 below the reduced voltage established at base 187 by conduction of transistor 200 and the voltage divider of resistors 204 and 205 the differential amplifier again returns to its normal state in which transistor 185 is conducting and transistor 180 is nonconducting. The reduced conduction of transistor 180 reflected by the current mirror as a reduction of conduction in transistor 195 turns off transistors 200 and 210 terminating the discharge of capacitors 85 and 86.

The cycle repeats itself with the beginning of another ramp voltage buildup across APC filter 29 followed by successive discharges through transistor 210. When coincidence occurs the horizontal retrace pulse at base 122 of transistor 120 and the sync pulse at base 132 of transistor 130 are coincident and the circuit is disabled causing cessation of frequency scanning by the following sequence of events. The positive retrace pulse turns on transistor 120 which in turn connects the junction of resistors 134 and 126 to ground removing the forward bias of transistors 150 and 175 turning them off. With transistor 150 nonconductive the current in collector 144 of transistor 140 establishes a positive voltage at base 162 across resistor 155 and diode 156 which turns on transistor 160. Resistor 164 is selected to produce a conduction level in transistor 160 which is approximately twice that of collector 143 with the result that transistor 160 not only carries the current in collector 143 but also discharges capacitor 165.

The removal of forward bias of transistor 175 opens up the series combination of transistors 170 and 175 which in the absence of coincidence caused diode 84 to conduct heavily producing the voltage buildup across capacitors 86 and 85. This results in a halt in the frequency scanning process of the oscillator. If the coincidence persists, the conduction of transistor 160 will eventually discharge capacitor 165 below the zener breakdown of diode 166 and the possibility of the immediate start of frequency scanning ceases. If, however, the coincidence is merely temporary as would exist, for example, during the brief interval of beat note coincidence under out-of-sync conditions the reappearance of the non-coincidence condition will again cause transistor 175 to conduct and capacitor 165 will again be charged. Transistors 170 and 175 will again conduct and the frequency scanning process will continue until synchronism, indicated by long term coincidence, is achieved.

The system function then, involves determination of a loss of synchronization and implementation of the frequency scanning of oscillator 25. The frequency scanning is interrupted during the existence of coincidence between the reference sync pulses and retrace pulses. The action of capacitor 165 and associated circuitry causes the system to "wait" and thereby determine whether the coincidence is merely temporary beat note condition evidenced by resumption of non-coincidence or whether it is the attainment of synchronization evidenced by continuing coincidence. As mentioned above once frequency synchronization is achieved frequency scanning immediately ceases and the normal phase lock loop operation of the APC takes over to produce phase synchronization of oscillator 25 to the reference pulses. It should also be noted that because transistor 220 is conductive only when zener 166 breaks down the discharge circuit is not operative under normal in-sync conditions and no interference with normal error signal excursion results.

What has been shown is a novel frequency scanning APC system suitable for use in a horizontal deflection system of a television receiver in which a simple discharge circuit operative upon the APC filter together with a coincidence determining circuit provides frequency scanning for enhanced pull-in performance without the use of auxiliary frequency scanning oscillators.

The circuit is also suitable for other automatic phase control applications and may be fabricated in a monolithic integrated circuit. A minimum of additional external terminal connections are required.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a television receiver including signal means recovering picture, audio and scansion synchronizing information from a received signal; a picture tube; automatic gain control means maintaining the recovered picture information at a substantially constant level, horizontal scansion means producing a high amplitude retrace signal and vertical scansion means developing a raster on said display means and horizontal scansion synchronization means including an oscillator and automatic phase control operative thereon synchronizing the horizontal scansion of said display with said synchronizing information, the improvement comprising:
   coincidence means detecting coincidence between said retrace pulse and said scansion synchronization information;
   lock detecting means determining the existence of an out-of-sync condition by comparing the relative durations of intervals of coincidence and non-coincidence; and
   configuring means responsive to said coincidence means and said lock detecting means causing cyclic variation of said oscillator frequency only if an out-of-sync condition and non-coincidence simultaneously occur.

2. A television receiver as set forth in claim 1, wherein said automatic phase control includes a filter and wherein configuring means include:
   charge means, causing said automatic phase control to produce an error voltage of increasing amplitude within said filter; and
   discharging means, abruptly reducing said error voltage when it exceeds a predetermined level.

3. A television receiver as set forth in claim 2, wherein said lock detecting means include:
   a hold capacitor;
   increase means charging said hold capacitor during non-coincidence;
   decrease means discharging said hold capacitor during coincidence; and threshold means, coupled to said hold capacitor, producing an output signal when the voltage on said hold capacitor exceeds a predetermined potential.

4. A television receiver as set forth in claim 3, wherein said increasing and decreasing means comprise a pair of oppositely poled current sources responsive to said synchronizing information and wherein said lock detecting means include:
a switch coupled to said increasing and decreasing means and said hold capacitor responsive to coincidence.

5. A television receiver as set forth in claim 4, wherein said coincidence means include:
an AND gate having inputs responsive to said synchronizing information and said retrace signal producing an output signal in the absence of coincidence.

6. A television receiver as set forth in claim 5, wherein said configuring means includes:
an AND gate having a first input coupled to the output of said coincidence means, a second input coupled to the output of said lock detecting means, and an output coupled to said charge means producing an output signal during the simultaneous occurrence of output signals from said coincidence means and said lock detecting means.

7. A television receiver as set forth in claim 6, wherein said increasing means are coupled to said hold capacitor and wherein said switch coupled said decreasing means to said hold capacitor during coincidence causing discharge of said hold capacitor.

8. In an automatic phase control system including an oscillator producing a pulse signal, a phase detector and filter synchronizing the output of said oscillator with a source of synchronizing pulse information, the improvement comprising:
coincidence means detecting coincidence between said oscillator pulse and said synchronizing pulse information;
lock detecting means determining the existence of an out-of-sync condition by comparing the relative durations of intervals of coincidence and non-coincidence; and
configuring means responsive to said coincidence means and said lock detecting means causing cyclic variation of said oscillator frequency only if an out-of-sync condition and non-coincidence simultaneously occur.

9. An automatic phase control as set forth in claim 8, wherein configuring means include:
charge means, causing said phase detector to produce an error voltage of increasing amplitude within said filter; and
discharge means, abruptly reducing said error voltage when it exceeds a predetermined level.

10. An automatic phase control system as set forth in claim 9, wherein said lock detecting means include:
a hold capacitor;
increase means charging said hold capacitor during non-coincidence;
decrease means discharging said hold capacitor during coincidence; and
threshold means, coupled to said hold capacitor, producing an out-of-sync signal when the voltage on said hold capacitor exceeds a predetermined level.

11. An automatic phase control system as set forth in claim 8, wherein said increasing and decreasing means comprise a pair of oppositely poled current sources responsive to said synchronizing information and wherein said lock detecting means include:
a switch coupled to said increasing and decreasing means and said hold capacitor responsive to coincidence.

12. An automatic phase control system as set forth in claim 11, wherein said coincidence means include:
an AND gate having inputs responsive to said synchronizing information and said retrace signal producing an output signal in the absence of coincidence.

13. An automatic phase control system as set forth in claim 12, wherein said configuring means include:
an AND gate having a first input coupled to the output of said coincidence means, a second input coupled to the output of said lock detecting means, and an output coupled to said charge means producing an output signal during the simultaneous occurrence of output signals from said coincidence means and said lock detecting means.

14. An automatic phase control system as set forth in claim 13, wherein said increasing means are coupled to said hold capacitor and wherein said switch couples said decreasing means to said hold capacitor during coincidence causing discharge of said hold capacitor.

* * * * *